US005845764A

United States Patent [19]

Ommundsen

[11] Patent Number: 5,845,764

[45] Date of Patent: Dec. 8, 1998

[54] WEAR ELEMENT FOR SCREW PRESSES OR THE LIKE

[76] Inventor: Dag Ommundsen, Hensveien 126, 3500 Hønefoss, Norway

[21] Appl. No.: 682,753

[22] PCT Filed: Jan. 31, 1995

[86] PCT No.: PCT/NO95/00021

§ 371 Date: Jul. 31, 1996

§ 102(e) Date: Jul. 31, 1996

[87] PCT Pub. No.: WO95/21025

PCT Pub. Date: Aug. 10, 1995

[30] Foreign Application Priority Data

Feb. 1, 1994 [NO] Norway .................................... 940330

[51] Int. Cl.[6] .................................................... B65G 33/26

[52] U.S. Cl. .............................................. 198/677; 494/54

[58] Field of Search ..................................... 198/664, 676, 198/677; 494/54

[56] References Cited

U.S. PATENT DOCUMENTS

| | | | |
|---|---|---|---|
| 3,764,062 | 10/1973 | Brautigam . | |
| 3,937,317 | 2/1976 | Fleury | 198/676 |
| 3,977,515 | 8/1976 | Lewoczko | 198/677 |
| 4,328,925 | 5/1982 | Shapiro | 198/676 |
| 5,429,581 | 7/1995 | Michaud | 198/677 |

FOREIGN PATENT DOCUMENTS

| | | |
|---|---|---|
| 1492210 | 11/1977 | United Kingdom . |
| 2048728 | 12/1980 | United Kingdom . |

*Primary Examiner*—Joseph E. Valenza
*Attorney, Agent, or Firm*—Wenderoth, Lind & Ponack, L. L. P.

[57] ABSTRACT

A wear element comprising a wear plate of a hard, typically ceramic material, locked in a dovetail recess of a bracket made of steel. The bracket consists of two initially separate parts comprising a respective one of the two inclined dovetail wedge surfaces of the dovetail recess. The two parts are welded together when positioned with their respective wedge surfaces tightly engaging a respective one of two complementary inclined surfaces formed on the wear plate.

5 Claims, 3 Drawing Sheets

WEAR ELEMENT FOR SCREW PRESSES OR THE LIKE

BACKGROUND OF THE INVENTION

The invention relates to a wear element intended to be mounted along a screw wing of a screw press or the like, comprising a wear plate of a hard, typically a ceramic, material locked in a dovetail recess formed in a steel bracket.

In operation of screw presses, such as in the paper and cellulose industry, sugar production etc, a screw rim is subject to very high wear. In order to reduce a similar problem in connection with centrifuges, special wear elements of the above kind have been proposed in GB 2 048 728 and DE 2 556 671. These prior structures, in which the wear plate is mounted in its bracket by being pushed into a preformed dovetail slit, require accurate machining and adjustment of the parts in order to obtain a stable and rigid locking of the wear plate in the dovetail slit. Thus, a considerable amount of diamond grinding of the very hard ceramic material will be necessary, with corresponding high costs of manufacture of the prior wear elements. As an alternative, the wear plates may be locked by through-going fasteners, but a such approach would reduce the functioning and life of the wear elements.

Among the various embodiments disclosed in the above GB 2 048 728 there are some in which the wear plate may be locked in its bracket by means of a wedge member abutting a rear or radially inner, canted surface of the wear plate and welded in place on the bracket. Although apparently not recognized in the specification of the GB publication, such approach could be adapted to permit the ceramic wear plate to be used "raw" directly from the furnace, without the necessity of any diamond grinding for dimensional adjustments. By locking or securing the ceramic plate to its bracket in this manner, rather than having to push it into a preformed slit in the bracket as in the other prior embodiments, a rigid and very strong locking of the wear plate in the bracket would be achieved, independently of any irregularities or inaccuracies in shape and dimensions of the ceramic wear plate.

On the other hand, in the above prior wedge member embodiment, the wedge member together with parts of the bracket located between the screw hub and ceramic wear plate will be exposed to the material conveyed through the apparatus. This is of minor concern in the prior GB 2 048 728 apparatus, since it is of the centrifuge type in which the abrasive material, in operation of the centrifuge, is concentrated along the rim of the screw wing or flight, while the radially inner portion of the wing is not. In screw presses on the other hand, such as used in the cellulosic industry, the entire radial extent of the wing is subject to heavy abrasive action and therefore, if the screw wing is to be protected by ceramic wear plates, it would be essential to have the portion of the screw wing intermediate the screw hub and ceramic wear plate as narrow as possible, especially in the converging compression portion of the press where the abrasion is at a maximum, as otherwise the unprotected intermedate portion would rapidly cave owing to the abrasive material filling the space between succesive screw wings.

SUMMARY OF THE INVENTION

The present invention, in addition to advantageously permitting the use of "raw" ceramic plates, solves this problem by providing a wear element intended to be mounted along the screw wing of a screw press or the like, comprising a wear plate of a hard, typically a ceramic, material, and comprising further a steel bracket, the wear element being locked in a dovetail connection recess in the steel bracket; the bracket being made up of two parts, each providing a respective one of two wedge surfaces of the dovetail connection recess; the wear element being formed with a back portion having wedge surfaces complementary to the wedge surfaces of the bracket parts and having side surfaces; both bracket parts each having a channel-like indentation whose bottom forms a respective one of the wedge surfaces of the dovetail connection recess, and legs of the channel-like indentations of one bracket part being welded to legs of the other bracket part along a welding groove extending on either side of the recess.

The term "welding" as used herein is to be understood in a broad sense including brazing, for example.

BRIEF DESCRIPTION OF THE DRAWINGS

The invention will now be described with reference to the accompanying drawings in which.

DETAILED DESCRIPTION OF THE INVENTION

The wear element shown on FIGS. 1_a_–1_d_ consists of a wear plate 2 of a hard material such as ceramics, rigidly locked in a dovetail recess formed in a bracket 1 made of steel.

Figure 2A:
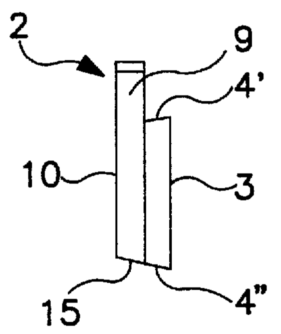
Figure 2B:
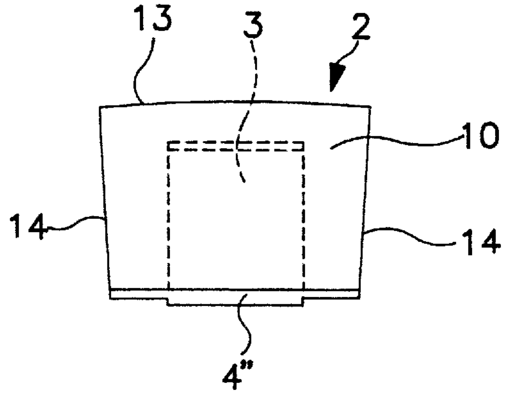
Figure 2C:
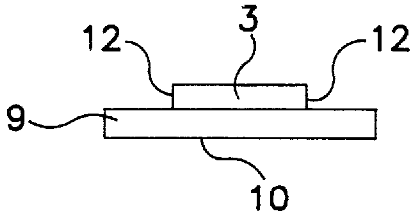

As best shown in FIGS. 2_a_–2_c_ the wear plate 2 includes a trapezoidal body portion 9 with an unbroken wear surface 10 and a back portion 3 opposite the wear surface 10. The back portion 3 is shown as a rectangular, preferably substantially square protrution of a smaller size than body portion 9 and formed with opposite, inclined wedge surfaces 4', 4" for engaging complementary inclined wedge surfaces of the bracket recess, and parallel straight (i.e. substantially normal to the wear surface) side surfaces 12. The body portion 9 advantageously has a slightly curved front edge 13 of a curvature adapted to a screw rim to which the wear element is to be mounted, and slightly rearwardly converging side edges 14 for engaging side edges of adjacent wear elements upon mounting onto the screw rim. In the example shown the one wedge surface 4' of the back portion and two side surfaces 12 thereof are offset relative to the front edge 13 and two side edges 14 respectively of the body portion 9, while the second wedge surface 4" of the back portion with a correspondingly inclined rear edge 15 of the body portion 9.

Preferably, the bracket 1 is made of stainless steel. As shown in FIGS. 3_a_–3_c_ according to an important feature of the invention, it is initially formed in two separate parts 6' and 6", adapted to be welded together around the back portion 3 of the wear plate 2. In the example shown the bracket 1, like the wear plate 2, is a substantially trapezoidal plate having a curved front edge 16 and converging side edges 17 which, upon assembly, generally coincide with the front edge 13 and side edges 14 respectively of the wear plate.

Figure 3A:
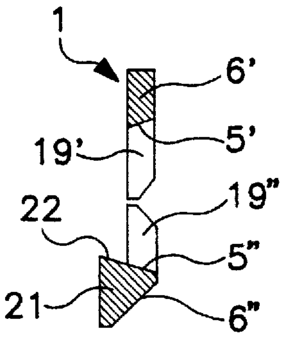
Figure 3B:
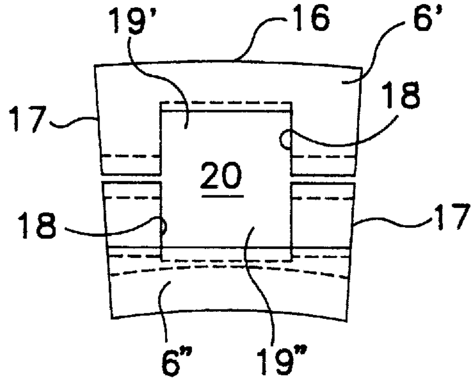
Figure 3C:
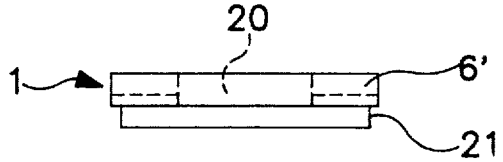

Each bracket part 6', 6" is provided with a channel-like indentation 19', 19" which, in the assembled (but yet not welded) state of the bracket parts shown in FIGS. 3*a*–3*c* together form a substantially square recess or opening 20 formed as a dovetail slit having opposite inclined wedge surfaces 5', 5" respectively corresponding to the wedge surfaces 4', 4" of the wear plate back portion 3 and having straight end surfaces 18 corresponding to the straight side surfaces 12 of the back portion. Thus, the bottom surface of the indentations 19', 19" of the bracket parts 6', 6" respectively each form one of the wedge surfaces 5', 5" of the dovetail recess 20.

The wear element according to the invention as shown in FIGS. 1*a*–1*d* is implemented by positioning the two separate bracket parts 6', 6" with their respective wedge surfaces 5', 5" tightly pressed against respective wedge surfaces 4', 4" of the wear plate back portion 3, and then welding the two bracket parts 6', 6" together along a welding groove 8 which, in the example shown in FIGS. 1*a*–1*d* and 3*a*–3*c* extends on either side of the recess 20 along a line parallel to and preferably substantially centrally between the wedge surfaces 5', 5". As a result the wear plate will be immovably locked between the wedge surfaces 5', 5" and end surfaces 18 of the bracket parts. Preferably, to further strengthen the relative immobility of the wear plate and bracket, an adhesive 7 may be applied at least between the bottom surface of the wear plate body portion 9 and top surface of bracket 1.

Figure 1A:
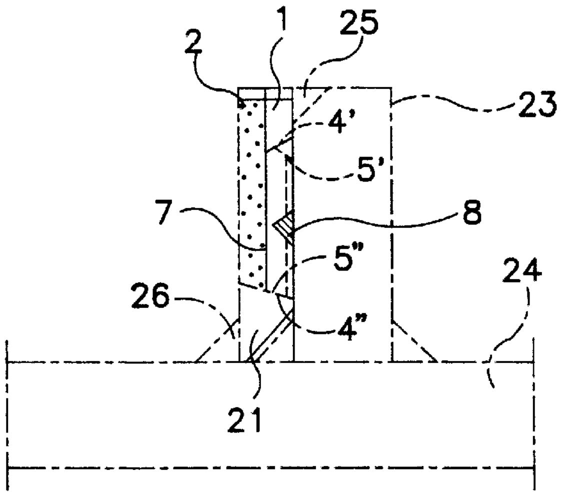
FIGS. 1_a_–2_d_ are a side view, top plan view, end view and bottom plan view respectively of a wear element according to the invention, FIGS. 2_a_–2_d_ are a side view, plan view and end view respectively of a wear plate to be used in the wear element according to the invention, FIGS. 3_a_–3_d_ are a sectional view, plan view and end view respectively of a bracket for holding the wear plate.
Figure 1B:
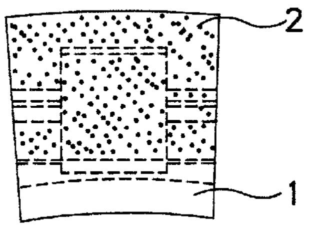
Figure 1C:
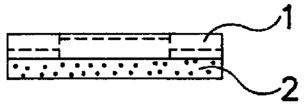
Figure 1D:
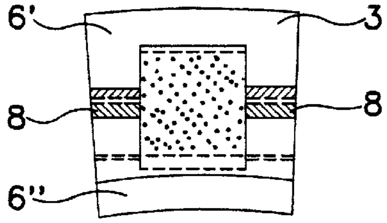

Advantageously, as shown in FIGS. 1*a* and 3*a*, one of the brackets 6" may have a thickened end portion 21 with a shoulder 22 aligned with the bracket wedge surface 5" to engage rear surface 15 of the wear plate body portion 9 aligned with the wedge surface 4" of the wear plate back portion 3, for providing additional support to the wear plate.

FIG. 1*a* also illustrates how wear elements of the invention can be welded to a screw wing 23 of a screw 24 shown in phantom lines, by front weld 25 and rear weld 26.

Figure 4:
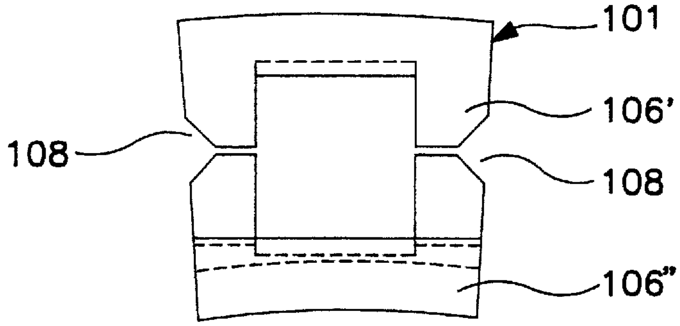
FIG. 4 is a plan view of a slightly modified embodiment of the bracket.

The bracket 101 shown in FIG. 4 differs from bracket 1 of FIGS. 3*a*–3*c*, only by the welding grooves 108 formed by the assembled bracket parts 106', 106" extending normal rather than parallel to the bracket top and bottom surfaces on each side thereof.

I claim:

1. Wear element intended to be mounted along the screw wing of a screw press or the like, comprising a wear plate of a hard, typically a ceramic, material, and comprising further a steel bracket, said wear plate being locked in a dovetail connection recess in said steel bracket; said bracket being made up of two parts, each providing a respective one of two wedge surfaces of said dovetail connection recess; said wear plate being formed with back portion having wedge surfaces complementary to said wedge surfaces of said bracket parts and having side surfaces; both said bracket parts each having a channel-like indentation whose bottom forms a respective one of said wedge surfaces of said dovetail connection recess, and legs of said channel-like indentations of one bracket part being welded to legs of the other bracket part along a welding groove extending on either side of said recess.

2. Wear element according to claim 1, wherein said welding groove extends along a line substantially centrally between said wedge surfaces of said the dovetail recess.

3. Wear element according to claim 1, wherein said welding groove extends across either side edge of said bracket, and preferably centrally relative to said bracket wedge surfaces.

4. Wear element according to claim 1, wherein said wear plate is formed with a substantially trapezoidal body portion having an unbroken wear surface opposite said back portion, and side surfaces of said back portion and at least one wedge surface thereof being staggered relative to side and front edges respectively of said body portion.

5. Wear element according to any one preceding claim 1, wherein one bracket part is formed with a thickened end portion with a shoulder in alignment with said bracket wedge surface to engage a rear surface of said body portion aligned with said wedge surface of said back portion.

* * * * *